(12) United States Patent
Dintenfass et al.

(10) Patent No.: US 10,334,026 B2
(45) Date of Patent: Jun. 25, 2019

(54) RESOURCE ASSIGNMENT SYSTEM

(71) Applicant: BANK OF AMERICA CORPORATION, Charlotte, NC (US)

(72) Inventors: Katherine Dintenfass, Lincoln, RI (US); Victoria L. Dravneek, Charlotte, NC (US); Alicia C. Jones-McFadden, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 379 days.

(21) Appl. No.: 15/231,381

(22) Filed: Aug. 8, 2016

(65) Prior Publication Data
US 2018/0041449 A1  Feb. 8, 2018

(51) Int. Cl.
G06F 15/16 (2006.01)
H04L 29/08 (2006.01)
G06F 9/50 (2006.01)

(52) U.S. Cl.
CPC ............ *H04L 67/10* (2013.01); *G06F 9/5077* (2013.01); *G06F 2209/5011* (2013.01)

(58) Field of Classification Search
CPC . H04L 67/10; G06F 9/5077; G06F 2209/5011
USPC ........................ 709/203, 226, 229
See application file for complete search history.

(56) References Cited

U.S. PATENT DOCUMENTS

| 5,513,102 | A  | 4/1996  | Auriemma |
| 5,970,478 | A  | 10/1999 | Walker et al. |
| 6,324,524 | B1 | 11/2001 | Lent et al. |
| 6,611,816 | B2 | 8/2003  | Lebda et al. |
| 6,778,968 | B1 | 8/2004  | Gulati |
| 7,266,537 | B2 | 9/2007  | Jacobsen et al. |
| 7,401,731 | B1 | 7/2008  | Pletz et al. |
| 7,421,408 | B2 | 9/2008  | Ryder |
| 7,472,088 | B2 | 12/2008 | Taylor et al. |
| 7,509,285 | B1 | 3/2009  | Maniar et al. |
| 7,542,921 | B1 | 6/2009  | Hildreth |
| 7,849,004 | B2 | 12/2010 | Choudhuri et al. |
| 7,886,963 | B1 | 2/2011  | Barth |
| 7,899,750 | B1 | 3/2011  | Klieman et al. |
| 7,921,048 | B2 | 4/2011  | Sloan et al. |
| 7,933,819 | B2 | 4/2011  | Dumas et al. |
| 7,991,690 | B2 | 8/2011  | Choudhuri et al. |
| 8,024,213 | B1 | 9/2011  | Fano et al. |

(Continued)

*Primary Examiner* — Thu Ha T Nguyen
(74) *Attorney, Agent, or Firm* — Michael A. Springs; Moore & Van Allen PLLC; Jeffrey R. Gray

(57) ABSTRACT

In response to receiving a request from a user to initiate a new resource pool, a determination of a purpose of the new resource pool is made. The system may receive the purpose of the resource pool from the user and thereafter access user data regarding types of resource pools owned by the user and other users and the allocation of resources therein. The system identifies suggested resource pools and/or resource pool allocations to present to the user at the time the user initiates the new resource pool. The systems may receive a selected resource pool from the user, and begin initiate the new resource pool. Determining the purpose of the new resource pool, and allocations therefor at the time the resource pool is initiated, improves processing since the processors open the desired resource pool and allocate resources at the time of initiating the new resource pool.

17 Claims, 3 Drawing Sheets

(56) References Cited

U.S. PATENT DOCUMENTS

| | | |
|---|---|---|
| 8,073,755 B2 | 12/2011 | Rose et al. |
| 8,185,472 B1 | 5/2012 | Boyd et al. |
| 8,191,769 B1 | 6/2012 | Barth |
| 8,209,232 B2 | 6/2012 | Callow et al. |
| 8,234,194 B2 | 7/2012 | Mele et al. |
| 8,271,364 B2 | 9/2012 | Nobili et al. |
| 8,301,501 B1 | 10/2012 | Glaeser et al. |
| 8,332,348 B1 | 12/2012 | Avery |
| 8,341,057 B1 | 12/2012 | Wagner et al. |
| 8,370,243 B1 | 2/2013 | Cernyar |
| 8,412,622 B2 | 4/2013 | Ariff et al. |
| 8,417,608 B2 | 4/2013 | Benefield et al. |
| 8,468,090 B2 | 6/2013 | Lesandro et al. |
| 8,473,410 B1 | 6/2013 | Haggerty et al. |
| 8,504,456 B2 | 8/2013 | Griffin et al. |
| 8,515,841 B2 | 8/2013 | Thalken et al. |
| 8,533,092 B1 | 9/2013 | Burrow et al. |
| 8,533,724 B1 * | 9/2013 | Theimer ............ G06F 9/45558 718/1 |
| 8,554,667 B2 | 10/2013 | Choudhuri et al. |
| 8,589,206 B2 * | 11/2013 | Boss ............... G06Q 10/06315 705/7.25 |
| 8,612,330 B1 * | 12/2013 | Certain ................. G06Q 30/06 705/37 |
| 8,635,132 B1 | 1/2014 | Wilks et al. |
| 8,635,158 B1 | 1/2014 | Ledder et al. |
| 8,694,400 B1 * | 4/2014 | Certain ................. G06Q 30/08 705/26.3 |
| 8,738,488 B2 | 5/2014 | Hall et al. |
| 8,768,736 B1 | 7/2014 | Chapman et al. |
| 9,047,616 B2 | 6/2015 | Schnabl et al. |
| 9,047,636 B2 | 6/2015 | Ross |
| 9,135,612 B1 | 9/2015 | Proctor, Jr. et al. |
| 9,262,754 B1 | 2/2016 | Jawharkar |
| 9,275,360 B2 | 3/2016 | He et al. |
| 9,466,036 B1 * | 10/2016 | Vicaire ................ G06F 9/5027 |
| 9,531,607 B1 * | 12/2016 | Pai ........................ H04L 43/08 |
| 9,720,732 B1 * | 8/2017 | Shih ..................... G06F 9/4887 |
| 10,097,627 B1 * | 10/2018 | Gafton ............... H04L 67/1004 |
| 10,097,953 B1 * | 10/2018 | Hartman ............. H04W 4/021 |
| 2001/0029519 A1 * | 10/2001 | Hallinan ............... G06F 9/5016 718/104 |
| 2002/0178112 A1 | 11/2002 | Goeller et al. |
| 2003/0028642 A1 * | 2/2003 | Agarwal ................. G06F 9/505 709/226 |
| 2004/0267897 A1 * | 12/2004 | Hill ........................ G06F 9/505 709/217 |
| 2005/0137953 A1 | 6/2005 | McDonough et al. |
| 2005/0267840 A1 | 12/2005 | Holm-Blagg et al. |
| 2006/0047813 A1 * | 3/2006 | Aggarwal ........... H04L 67/1008 709/226 |
| 2007/0016907 A1 * | 1/2007 | Benedetti ............. G06F 9/5038 718/104 |
| 2007/0174346 A1 * | 7/2007 | Brown ................... G06F 16/20 |
| 2007/0198335 A1 | 8/2007 | Edwards et al. |
| 2007/0288313 A1 | 12/2007 | Brodson et al. |
| 2008/0086759 A1 | 4/2008 | Colson |
| 2008/0178113 A1 | 7/2008 | Headrick et al. |
| 2008/0201269 A1 | 8/2008 | Hollins et al. |
| 2009/0119162 A1 | 5/2009 | Kaplan |
| 2010/0161379 A1 | 6/2010 | Bene et al. |
| 2010/0179930 A1 | 7/2010 | Teller et al. |
| 2010/0280935 A1 | 11/2010 | Fellowes et al. |
| 2010/0299249 A1 | 11/2010 | Carlson et al. |
| 2011/0047039 A1 | 2/2011 | Crames et al. |
| 2011/0191485 A1 * | 8/2011 | Umbehocker ........ G06F 21/604 709/229 |
| 2011/0295722 A1 | 12/2011 | Reisman |
| 2012/0053987 A1 | 3/2012 | Satyavolu et al. |
| 2012/0130886 A1 | 5/2012 | Shergill et al. |
| 2012/0157042 A1 | 6/2012 | McCanna et al. |
| 2012/0311138 A1 * | 12/2012 | Inamdar ............. G06F 11/3404 709/224 |
| 2013/0013119 A1 | 1/2013 | Mansfield et al. |
| 2013/0046702 A1 | 2/2013 | Ross et al. |
| 2013/0060617 A1 | 3/2013 | Ross et al. |
| 2013/0080321 A1 | 3/2013 | Mulhall |
| 2013/0198047 A1 | 8/2013 | Houseworth et al. |
| 2013/0346133 A1 | 12/2013 | Soliman et al. |
| 2014/0067634 A1 | 3/2014 | Sowder et al. |
| 2014/0067712 A1 | 3/2014 | Prasad et al. |
| 2014/0074688 A1 | 3/2014 | Shvarts et al. |
| 2014/0095304 A1 | 4/2014 | Ganesh |
| 2014/0137110 A1 * | 5/2014 | Engle .................... G06F 9/5022 718/1 |
| 2014/0173613 A1 * | 6/2014 | Dunn .................... G06F 9/5061 718/104 |
| 2014/0229233 A1 | 8/2014 | Hu |
| 2014/0304085 A1 | 10/2014 | Liu et al. |
| 2014/0365355 A1 | 12/2014 | Shvarts |
| 2015/0064671 A1 | 3/2015 | Murville et al. |
| 2015/0081405 A1 | 3/2015 | Ross et al. |
| 2015/0081411 A1 | 3/2015 | Tucker et al. |
| 2015/0081450 A1 | 3/2015 | Bean |
| 2015/0149204 A1 | 5/2015 | Unser et al. |
| 2015/0154629 A1 | 6/2015 | Celli et al. |
| 2015/0220923 A1 | 8/2015 | Vasant Akole et al. |
| 2015/0287017 A1 | 10/2015 | Iqbal et al. |
| 2016/0012465 A1 | 1/2016 | Sharp |
| 2016/0027102 A1 | 1/2016 | Smith et al. |
| 2016/0027105 A1 | 1/2016 | Mahajan et al. |
| 2016/0110813 A1 | 4/2016 | Hayden |
| 2016/0269387 A1 | 9/2016 | Razack et al. |
| 2016/0314471 A1 | 10/2016 | Gerber et al. |
| 2016/0314528 A1 | 10/2016 | Abbott et al. |
| 2016/0371689 A1 | 12/2016 | Brown et al. |
| 2017/0076378 A1 | 3/2017 | Dintenfass et al. |
| 2017/0076379 A1 | 3/2017 | Wadley et al. |
| 2017/0076380 A1 * | 3/2017 | Dintenfass ............ G06Q 40/06 |
| 2017/0116038 A1 * | 4/2017 | Netto ..................... G06F 9/4881 |
| 2017/0116621 A1 | 4/2017 | Gerard et al. |
| 2017/0193501 A1 | 7/2017 | Cole et al. |
| 2017/0195994 A1 | 7/2017 | Cole et al. |
| 2017/0359229 A1 | 12/2017 | Dintenfass et al. |
| 2018/0034744 A1 | 2/2018 | Dintenfass et al. |
| 2018/0041442 A1 * | 2/2018 | Jones-McFadden .... H04L 47/70 |
| 2018/0375794 A1 * | 12/2018 | Greene ................. H04L 47/823 |
| 2018/0375960 A1 * | 12/2018 | Greene ................. H04L 67/327 |

* cited by examiner

RESOURCE ASSIGNMENT SYSTEM

FIELD

The present invention relates to utilizing a distributed network of systems for identifying proposed uses for resources and utilizing user data to assign resources to improve upon processing efficiency of resource allocation.

BACKGROUND

Identifying the assignment of resources can be a difficult and costly process. Having to assign resources after an initiation, or having to reassign resources when they are not initially assigned properly decreases the capacity and efficiency of the processing devices because the processing devices are required to make multiple connections and assignments over the distributed network when the resource assignment is not identified and carried out during initiation. Accordingly, there exists a need to facilitate the allocation of resources at initiation of new resource pools.

BRIEF SUMMARY

Embodiments of the present invention address these and/or other needs by providing an innovative system, method and computer program product for determining the purpose of a new resource pool, as well as allocating resources in the new resource pool and current resource pools at the time of initiating the new resource pool. As such, a user may request the initiation of a new resource pool, and before initiating the resource pool the systems may request the purpose of the new resource pool. The systems may receive the purpose of the resource pool from the user over a distributed network and thereafter access user data (e.g., of the user or other users) regarding types of resource pools owned by users and the allocation of resources within the resource pools. The systems may identify suggested resource pools and/or resource pool allocations to present to the user at the time the user initiates the new resource pool. The systems may receive a selected resource pool from the user, and begin initiation of the new resource pool. The user may further share information associated with the new resource pool with other users. The systems may provide information about third-party entities to the user at the time of initiating the new resource pool. It should be understood that by determining the purpose of the resource pool at the time of initiating the new resource pool the entity may provide improved processing since the systems can properly initiate the desired resource pool and properly allocate resources at the time of initiating the new resource pool, instead of having to take multiple actions well after initiating the new resource pool.

Moreover, the systems described herein may allow for the access of user data regarding the allocation of resources within various resource pools. The systems may identify suggested resource allocations for the new resource pool, as well as suggested modifications for current resource pools of the user, and present both to the user along with the user's goals associated with the new resource pool. The user may select a suggested resource allocation for the new resource pool, as well as suggested modifications for current resource pools in order to determine how the selections affect the user's goals. Once the suggested resource allocations for the new resource pool and the current resource pools are made, the processing systems initiate the selected resource allocation and/or the suggested modifications selected by the users at the time of initiating the new resource pool. In this way, the processing requirements for processing resource allocations associated with the resource pools of the user are reduced since the allocations occur at the initiation of the new resource pools.

The new resource pool, the allocations of resources for the new resource pool, and the allocations of resources for the current resource pools of the user may all be provided in an integrated interface that illustrates in one location all the changes that are to be made to the user's resource pools and allocations, both within one entity and across entities, at the time of initiation of the new resource pool. This allows the user to make adjustments to the resource allocations of various resource pools within a single interface instead of having to access multiple interfaces across multiple systems. In some embodiments the interface may include the purpose of the resource pools and/or the goals associated with the resource pools, such that the user may identify the progress towards reaching the goals associated with the resource pools and the most effective way of reaching the goals.

Embodiments of the invention include systems, methods, and computer program products for providing suggested resource pools at initiation of a resource pool. The invention includes electronically receiving an indication from a user to initiate a new resource pool, wherein the indication is received from a user computer system; electronically requesting an inquiry regarding a purpose for the new resource pool, wherein the request is sent to the user computer system by an entity system; electronically receiving a response from the user regarding the purpose of new the resource pool, wherein the response is received from the user computer system; electronically accessing user data for the user or other users regarding other user resource pools of the user or other users, wherein the user data is accessed by accessing resource pool systems; electronically identifying a suggested resource pool based on the response from the user regarding the purpose of the new resource pool and the user data; and electronically determining when the new resource pool initiated by the user and the suggested resource pool are the same and automatically initiating the new resource pool of the user. The invention further includes electronically determining when the new resource pool initiated by the user and the suggested resource pool are different, and in response electronically providing the user the suggested resource pool on a user interface, wherein the user interface is provided by the entity system on the user computer system; and electronically receiving a selected resource pool, wherein the selected resource pool is received from the user computer system. The invention further includes electronically initiating the selected resource pool, wherein the selected resource pool is initiated through the entity systems.

In further accord with embodiments of the invention, processing of the initiation of the new resource pool is improved by automatically initiating the resource pool of the user without alerting the user of the suggested resource pool when the resource pool initiated by the user and the suggested resource pool are the same.

In other embodiments of the invention, the inquiry regarding the purpose for the new resource pool comprises an inquiry regarding a resource pool type and a resource allocation amount for the new resource pool; and wherein the response from the user regarding the purpose of the new resource pool comprises the resource pool type and the resource allocation amount.

In still other embodiments of the invention, the inquiry regarding the purpose for the new resource pool is an educated inquiry that includes potential purposes presented for user selection based on the user data related to the other resource pools of the user or an allocation of resources within the other resource pools of the user.

In yet other embodiments, the invention further includes electronically providing the user third party entity information related to the purpose of the new resource pool.

In other embodiments, the invention further includes electronically receiving a request from the user to provide new resource pool information to one or more of the other users to aid in achieving the purpose of the new resource pool.

In further accord with embodiments, the invention further includes electronically accessing the user data for the user regarding resource allocations within the other resource pools of the user; electronically identifying one or more suggested resource allocations for the new resource pool based on the response from the user regarding the purpose of the new resource pool and the user data regarding the resource allocations within the other resource pools of the user; electronically providing the user the one or more suggested resource allocations for the new resource pool on the user interface, wherein the user interface is provided by the entity systems on the user computer system; electronically receiving a selected resource allocation for the new resource pool from the one or more suggested resource allocations, wherein the selected resource allocation for the resource pool is received from the user computer system; and electronically initiate the selected resource allocation for the new resource pool, wherein the selected resource allocation for the new resource pool is initiated through the entity systems.

In other embodiments, the invention further includes electronically accessing the user data for the other users regarding resource allocations within the other resource pools of the other users; electronically identifying one or more suggested resource allocations for the new resource pool based on the response from the user regarding the purpose of the new resource pool and the user data regarding the resource allocations within the other resource pools of the other users; electronically providing the user the one or more suggested resource allocations for the new resource pool on the user interface, wherein the user interface is provided by the entity systems on the user computer system; electronically receiving a selected resource allocation for the new resource pool from the one or more suggested resource allocations, wherein the selected resource allocation for the resource pool is received from the user computer system; and electronically initiating the selected resource allocation for the new resource pool, wherein the selected resource allocation for the new resource pool is initiated through the entity systems.

In still other embodiments, the invention further includes electronically receiving an indication from the user for a resource allocation for the resource pool, wherein the indication is received from the user computer system; electronically accessing the user data for other users regarding resource allocations for the resource pools of other users, by accessing user resource pool systems; electronically determining one or more suggested resource allocations for the new resource pool; and electronically determining when the resource allocation for the new resource pool received from the user and the one or more suggested resource allocations are the same and automatically initiating the resource allocation. The invention further includes electronically determining when the resource allocation received from the user and the one or more suggested resource allocations are different, and in response electronically providing the user the one or more suggested resource allocations, wherein the user interface is provided by the entity system on the user computer system; and electronically receiving a selected resource allocation for the resource allocation, wherein the selected resource allocation is received from the user system. The invention further includes electronically initiating the resource allocation, wherein the resource allocation is initiated through the entity systems, and wherein processing of the initiation of the selected resource allocation and initiation of the new resource pool at the same time improves the processing by reducing the number of processing steps.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
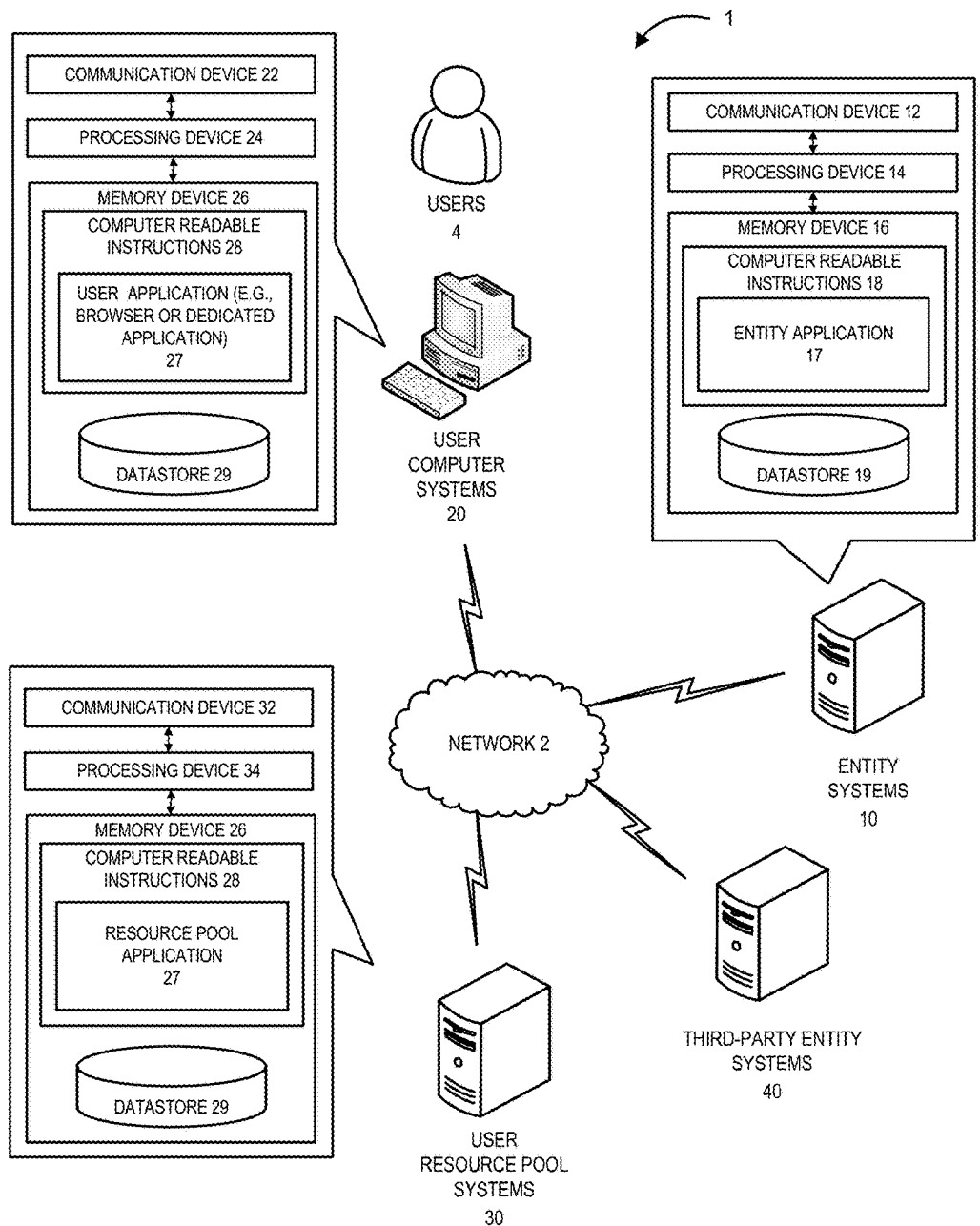
Figure 2:
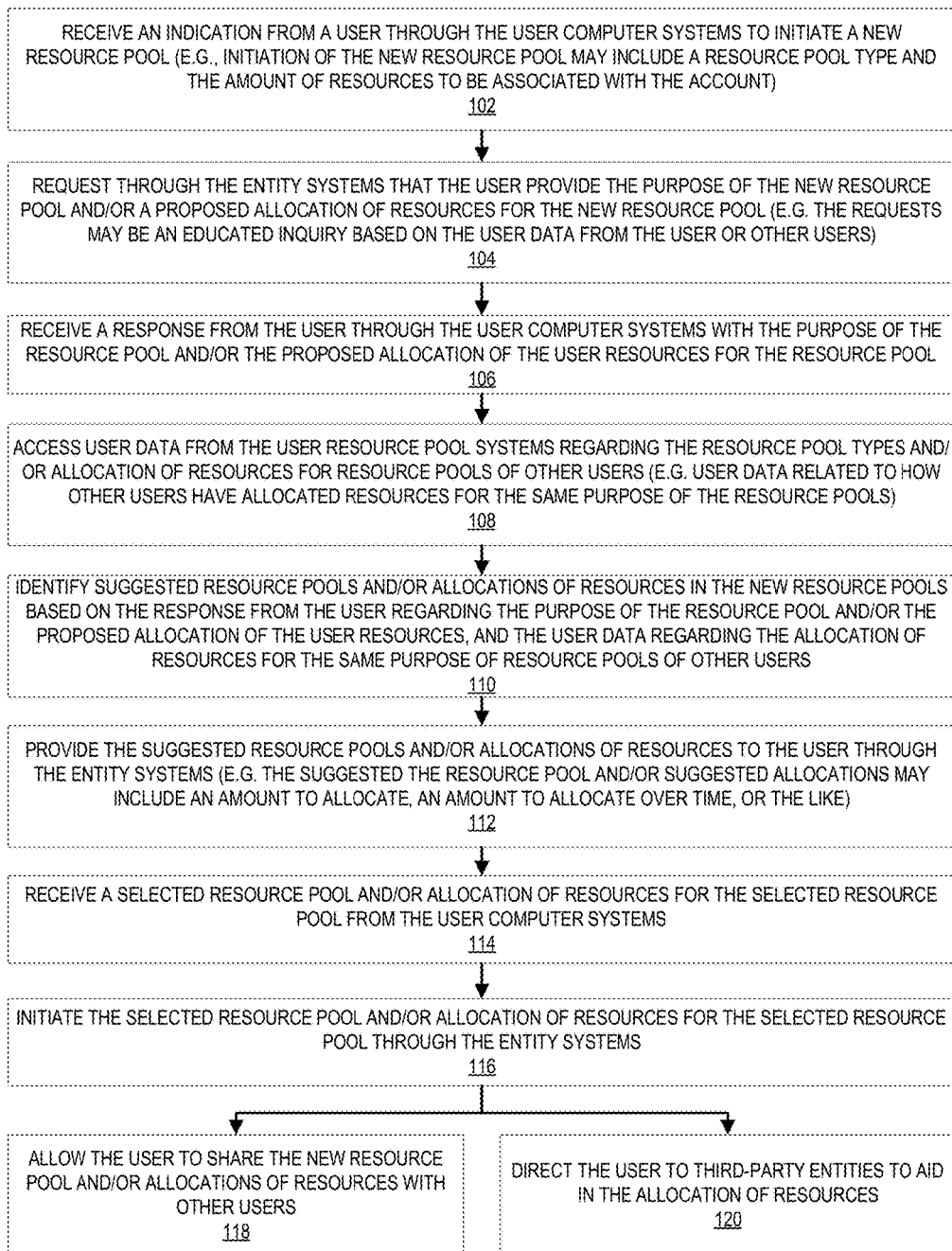
Figure 3:
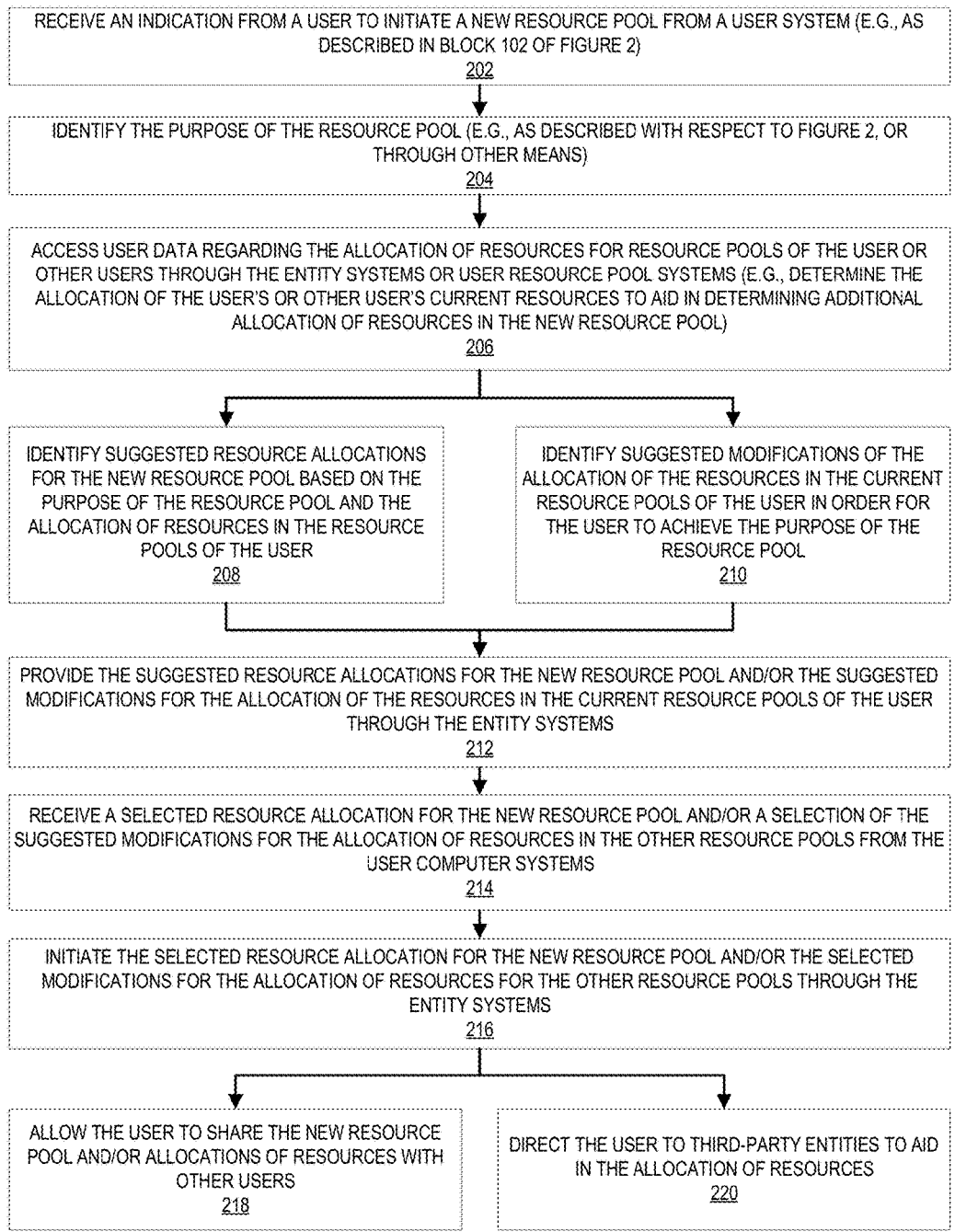

Having thus described embodiments of the invention in general terms, reference will now be made the accompanying drawings, wherein:

FIG. 1 presents a block diagram illustrating a resource assignment system environment, in accordance with aspects of the invention;

FIG. 2 presents a flow diagram illustrating the assignment of a new resource pool and resources at the time of initiation of the new resource pool, in accordance with aspects of the invention; and FIG. 3 presents a flow diagram illustrating the allocation of resources and modification of resource allocation along with the assignment of the new resource pool at the time of the initiation of the new resource pool, in accordance with aspects of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" or "associated with" something else, it may be based on or associated with one or more other things as well. In other words, unless expressly indicated otherwise, as used herein "based on" means "based at least in part on" or "based at least partially on" and "associated with" means "associated at least in part with" or "associated at least partially on." Like numbers refer to like elements throughout.

Embodiments of the present invention provide systems, methods, and computer program products that provide for the assignment of the new resource pool, and for the allocation of resources for the new resource pool and/or modification of the allocation of resources for current resource pools at the time of initiation of the new resource pool.

FIG. 1 illustrates a resource assignment system environment 1, in accordance with embodiments of the invention. As illustrated in FIG. 1, one or more entity systems 10 are operatively coupled, via a network 2, to one or more user computer systems 20, one or more user resource pool systems 30, one or more third-party entity systems 40, or other like systems. In this way, a user 4 (e.g., one or more associates, employees, agents, contractors, sub-contractors, third-party representatives, or the like) may initiate, through an entity application 17, a user application 27, a resource pool application 37, or the like, a new resource pool; and the entity may determine the purpose of the new resource pool and utilize user data from the entity systems 20, resource pool systems 30 and/or other systems to assign the resources to a particular resource pool type and/or identify suggested resource allocations for the resources within the new resource pool and/or other resource pools. As such, users 4 may use the applications 27, and/or an entity may use the entity application 17 to take actions (e.g., initiating a new resource pool and/or allocating resources within resource pools) and/or to communicate with (e.g., send or receive data from, or the like) the applications and the devices within the resource assignment system environment 1 to achieve the steps of the processes described herein.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, devices, and/or devices on the network 2.

As illustrated in FIG. 1, the entity systems 10 generally comprise one or more communication devices 12, one or more processing devices 14, and one or more memory devices 16. The one or more processing devices 14 are operatively coupled to the one or more communication devices 12 and the one or more memory devices 16. As used herein, the term "processing device" or "processor" generally includes circuitry used for implementing the communication and/or logic functions of a particular system. For example, a processing device 14 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The one or more processing devices 14 may include functionality to operate one or more software programs based on computer-readable instructions 18 thereof, which may be stored in the one or more memory devices 16.

The one or more processing devices 14 use the one or more communication devices 12 to communicate with the network 2 and other devices on the network 2, such as, but not limited to, the user computer systems 20, the user resource pool systems 30, the third-party entity systems 40, and/or other systems. As such, the one or more communication devices 12 generally comprise a wireless transceiver, modem, server, electrical connection, electrical circuit, or other device for communicating with other devices on the network 2. The one or more communication devices 12 may further include an interface that accepts one or more network interface cards, ports for connection of network devices, Universal Serial Bus (USB) connectors and the like.

As further illustrated in FIG. 1, the entity systems 10 comprise computer-readable instructions 18 stored in the memory device 16, which in one embodiment includes the computer-readable instructions 18 of the entity application 17. In some embodiments, the one or more memory devices 16 include one or more data stores 19 for storing data related to the entity systems 10, including, but not limited to, data created, accessed, and/or used by the entity application 17. The entity application 17 may allow the user to initiate the new resource pool, assign a type of resource pool to the new resource pool, allocate resources to the new resource pool, and allocate resources within other resource pools in order to help to achieve the purpose of the new resource pool.

As illustrated in FIG. 1, users 4 may access the entity application 17 through the use of the user application 27 (e.g., web browser, dedicated application, or the like), or other applications, through a user computer system 20. The user computer system 20 may be a desktop, laptop, tablet, mobile device (e.g., smartphone device, or other mobile device), or any other type of computer that generally comprises one or more communication devices 22, one or more processing devices 24, and one or more memory devices 26.

The one or more processing devices 24 are operatively coupled to the one or more communication devices 22, and the one or more memory devices 26. The one or more processing devices 24 use the one or more communication devices 22 to communicate with the network 2 and other devices on the network 2, such as, but not limited to, the entity systems 10, the resource pool systems 30, the third-party entity systems 40, and/or other systems. As such, the one or more communication devices 22 generally comprise a wireless transceiver, modem, server, electrical connection, or other device for communicating with other devices on the network 2. The one or more communication devices 12 may further include an interface that accepts one or more network interface cards, ports for connection of network devices, Universal Serial Bus (USB) connectors and the like. Moreover, the one or more communication devices 22 may include a keypad, keyboard, touch-screen, touchpad, microphone, mouse, joystick, other pointer device, button, soft key, and/or other input/output device(s) for communicating with the users 4.

As illustrated in FIG. 1, the user computer systems 20 may have computer-readable instructions 28 stored in the one or more memory devices 26, which in one embodiment includes the computer-readable instructions 28 of the user application 27, such as a dedicated application (e.g., apps, applet, or the like), portions of dedicated applications, web browser or other apps that allow access to applications located on other systems, or the like.

As illustrated in FIG. 1, the entity may retrieve user data regarding resource pools and/or resource allocations within resource pools of the user or other users by accessing the user resource pool systems 30. The user resource pool systems 30 generally comprise one or more communication devices 32, one or more processing devices 34, and one or more memory devices 36.

The one or more processing devices 34 are operatively coupled to the one or more communication devices 32, and the one or more memory devices 36. The one or more processing devices 34 use the one or more communication devices 32 to communicate with the network 2 and other devices on the network 2, such as, but not limited to, the entity systems 10, the user computer systems 20, the third-party entity systems 40, and/or other systems. As such, the one or more communication devices 32 generally comprise a wireless transceiver, modem, server, electrical connection, or other device for communicating with other devices on the network 2. The one or more communication devices 32 may further include an interface that accepts one or more network interface cards, ports for connection of network devices, Universal Serial Bus (USB) connectors and the like.

As illustrated in FIG. 1, the user resource pool systems 30 may have computer-readable instructions 38 stored in the one or more memory devices 36, which in one embodiment includes the computer-readable instructions 38 of the resource pool application 37 that allow the entity and/or the user 4 to access user data that is stored in the user resource pool systems 30.

FIG. 1 further illustrates third-party entity systems 40 and/or other like systems that are operatively coupled to the entity systems 10, the user computer systems 20, the user resource pool systems 30, and/or other like systems, through the network 2. The third-party entity systems 40 and/or other like systems have devices the same as or similar to the devices described with respect to the entity systems 10, user computer systems 20, and/or user resource pool systems 30 (e.g., one or more communication devices, one or more processing devices, and one or more memory devices with computer-readable instructions of one or more applications, one or more datastores, or the like). Thus, the third-party entity systems 40 and/or other like systems communicate with the entity systems 10, user computer systems 20, and/or user resource pool systems 30 in the same or similar way as previously described with respect to the entity systems 10, user computer systems 20, and/or user resource pool systems 30. The third-party entity systems 40, associated data storage, and/or third-party applications, are used for accessing resource pools and resource allocations (e.g., user data) stored at third-parties, for receiving information associated with the resource pool type and/or resource allocations, and/or for sharing information with other users and/or other entities, or the like.

FIG. 2 presents a process flow 100 illustrating the assignment of a resource pool type and allocation of resources at the time of initiation of the resource pool, in accordance with aspects of the invention. Block 102 in FIG. 2 illustrates that an indication to initiate a new resource pool is received by an entity (e.g., from the entity systems 10) from a user 4 (e.g., through the use of the user computer systems 20). In some aspects of the invention the request is a request to open a new account with the financial institution. In some aspects of the invention the request may include a resource pool type in which the user is interested (e.g., a savings account, investment account, emergency account, or the like type of account). In some aspects of the invention the request may include the amount of resources that the user 4 would like to allocate to the new resource pool (or allocate to different areas within the resource pool). For example, the user 4 may request that "X1" resources be allocated to the new resource pool, such as a savings account. Alternatively, or in addition, the user 4 may request that "X2" resources from the "X1" resources, or all of the "X1" resources are, allocated to the new resource pool for a specific purpose, such as an emergency fund allocation within the new resource pool.

Block 104 in FIG. 2 illustrates that in response to receiving the request to initiate a new resource pool, a request from the entity is sent through the entity systems 10 to the user 4 through the user computer systems 20 to inquire about the purpose of the new resource pool (e.g., how the resources in the new resource pool are going to be used, an objective the user 4 is trying to achieve, and/or a goal associated with the new resource pool). In some aspects of the invention the entity request regarding the purpose of the resource pool may be an educated request, such that the entity may determine a likely purpose of the new resource pool. For example, the entity may know (e.g., through user data) that the user 4 has a new baby, children of middle school age, or the like, and the user 4 already has a retirement account, but has requested that the new resource pool being initiated is an investment account. As such, the entity systems 10 may make an educated request by asking if the new investment account is an education investment account. In other examples, the entity system 10 may know (e.g., through user data) that the user 4 currently only has a checking account, has requested an initiation of a new savings resource pool, and has indicated that "X3" amount of resource are going to be allocated to the resource pool. As such, the entity systems 10 may make an educated request by asking if the new savings resource pool is for an emergency fund. Alternatively, instead of providing an educated request, the entity systems 10 may ask the user to provide information related to how the user 4 plans on using the resources in the new resource pool (e.g., purpose of the pool, objective, and/or goal associated with the new resource pool). The request may require the user 4 to provide a written response, to select a type of resource pool from a dropdown menu, and/or make a selection of resource pools provided in multiple choice form, all of which may be provided in a user interface. In some aspects of the invention, the entity may provide questions regarding how the user 4 plans to use the account. The interface may include information about all of the resource pools owned by the user both through the entity and through third party entities. For example, the user 4 may have previously allowed, or allowed the entity through the initiation of the new resource pool to access the user's resource pools at other third-party entities in order to provide the most relevant user data to the user 4 and/or the entity. This user data may help to user 4 and/or the entity determine what type of resource pool the user 4 may be interested in opening.

FIG. 2 further illustrates in block 106 that a response is received from the user 4 through the user computer systems 20 regarding the purpose of the new resource pool and/or the purpose of the funds within the new resource pool. For example, the user 4 may provide information related to how the user 4 plans on using the new resource pool and/or the resources that are going to be contributed to the new resource pool, such as by answering questions asked by the entity. As such, the user 4 may indicate that the new resource pool is for education expenses, emergency resources, or other like purpose. Alternatively, the user 4 may indicate that the user 4 plans on using the resource pool for investments, checking, savings, or the like to reach an objective or a goal (e.g., buy a house, take a trip, buy a car, pay down debt, or the like). In some embodiments of the invention, the entity system 10 may lock the user computer system 10 (e.g., mobile phone), or lock the user's ability to proceed with opening the new resource pool through the interface, until the user identifies the purpose of the resource pool. As such, the entity systems 10 may prevent the user from initiating the new resource pool until the purpose of the pool is provided. By identifying the purpose of the resource pool the entity may be able to provide much improved information to the user 4 so that the user 4 may make informed decisions at the time of initiating the new resource pool, which improves the processing for the user's resource pools and/or for the user's allocation of resources within the user resource pools.

Block 108 in FIG. 2 illustrates that user data (e.g., user data or other user data) regarding the types of resource pools and the allocation of resources for resource pools of the user or other users (e.g., one or more second users) is captured through the use of the entity systems 10, the user resource pool systems 30, and/or the third-party entity systems 40. For example, the entity systems 10 may access the types of resource pools that the user 4 has with the entity or other third-party entities by accessing the user's other resource pools (e.g., with permission from the user 4, such as a login name and/or password) and identifying the in-flows and out flows of resources in the user's resource pools. The entity systems 10 may also access the types of resource pools that other similar users (e.g., users of the same age, demographics, lifestyles, transactions, living situations, locations, or the like) to determine what resource pools the other users have and how the other users are allocating resources. For example, the other users that have children of similar age to the user 4 may have education resource pools that have "X4" amount of resources. Alternatively, the other users that have similar income and/or similar expenses (e.g., based on in-flows and outflow of the other users' resource pools) as the user 4 may have resource pools for an emergency that may have "X5" amount of resources. In other examples, the other users may have accounts to save for an event and/or to pay down debt. It should be understood that the user data (e.g., data associated with the user 4 and/or other users) may be utilized as described with respect to block 104 and/or below with respect to block 110.

Block 110 in FIG. 2 illustrates that the entity systems 10 utilize the response from the user 4 regarding the purpose of the new resource pool and/or the proposed allocation of the user's resources in the new resource pool, and the user data regarding the resource pool types and allocation of resources of the user 4 and/or other users to determine suggested resource pools and/or suggested allocation of resources within the resource pools. For example, the other user data may provide information indicating that for users trying to save for a purpose, instead of opening a savings account, the users typically open money market accounts to receive improved returns over savings accounts, which earn a much lower rate of return. In other examples, for an emergency resource pool, the entity systems 10 may suggest a savings account, such that the resources may be accessed quickly, if necessary. Moreover, the entity systems 10 may suggest increasing the amount of initial resources allocated to the education resource pool, the emergency resource pool, or another resource pool, or to provide a monthly resource allocation to reach a particular resource amount in the resource pools. Moreover, as will be discussed with respect to FIG. 3 in further detail, the entity systems 10 may also recommend an allocation of resources to the new resource pool based in part on the user's allocation of resources in the user's other resource pools.

FIG. 2 further illustrates in block 112 that the suggested resource pools and/or allocations of resources are provided to the user 4 through the entity systems 20 and displayed to the user 4 on a user interface (e.g., integrated resource pool interface) on the user computer systems 10. For example, a suggestion may be made to the user 4 to open a specific type of resource pool that is most beneficial for the purpose of the new resource pool, and/or provide a specific allocation of user's resources in the new resource pool (e.g., as determined from block 110). The suggested resource pool and/or allocation of resources that are provided to the user 4 in the user interface may further include pre-populated resource amounts to allocate to the one or more suggested resource pool (e.g., initial allocations, or reoccurring allocations for a time period). The suggested allocation amounts may include amounts that the entity has determined are available from the user data (e.g., the resource pools of the user with the entity and/or third-party entities). For example, the entity system 10 may determine that the user 4 has a savings resource pool with an "X6" resource amount, 50% of which can be transferred to an investment account, while maintaining 50% as an emergency fund. By making this determination at the point of initiating the new resource pool the entity does not have to take additional processing steps to change the type of resource pools (e.g., if the user opened the wrong type of resource pool and has to later convert it or open a new resource pool), or to make additional allocation of resources after the resource pool is formed (e.g., funding the new resource pool at a point in time after initiation of the new resource pool), and as such, the steps the processing devices are required to take may be reduced (e.g., processing times are reduced, processing capacity is improved, or the like).

In other aspects of the invention, as will be discussed in further detail with respect to FIG. 3, if the user is trying to reach a specific purpose, such as a specific goal with the new resource pool, the entity systems 10 may automatically provide a resource goal amount to the user 4 in the user interface based on the purpose of the account (e.g., for a vacation) and/or on user data for other users with similar resources (e.g., costs of vacations for users with similar inflows and outflows, or the like). In other examples, the goal may be a goal to pay down a particular amount. In still other examples, the goal may be a resource amount to reach for an emergency fund. In other example, the goal may be a resource amount to reach in 15 years when the user's child will attend college. As such, not only may the financial institution provide a suggested allocation amount for the new resource pool, but may also provide a suggested goal amount in order to reach the purpose of the resource pool (e.g., the suggested allocation amount may be initial amount and/or a recurring amount over time in order to reach the suggested goal).

In some embodiments of the invention when the suggested resource pool determined by the entity systems 10 is the same as the resource pool type requested by the user 4 (e.g., as requested in one aspect of the invention as described in block 102), the entity systems 10 may not provide the suggest resource pools to the user as described above, and instead may simply proceed with initiating the new resource pool, or may otherwise provide an indication to the user 4 that the suggested resource pool determined by the entity systems 10 is the same as the resource pool requested by the user 4. For example, the entity systems 10 may display in the user interface an indication that the request resource pool type received from the user 4 meets the suggested resource pool type determined by the entity systems 10. Alternatively, or in addition, the systems 10 may provide the suggested goal described above.

Block 114 of FIG. 2 illustrates that a selection of a suggested resource pool and/or a selection of the allocation of resources for the selected resource pool is received from the user 4 through the user interface on the user computer systems 10. For example, the user 4 may select one or more of the one or more suggested resource pools presented to the user 4. Moreover, the user 4 may select one or more of the one or more suggested resource allocations for the new resource pool. Additionally, the user 4 may select one or more suggested goals presented by the entity systems 10. It should be further understood that the user 4 may accept the resource allocations and/or goals suggested by the entity systems 10, or the user 4 may modify the resource allocations and/or goals suggested by the entity systems 10 through the user interface. For example, the user 4 may decide to allocate only 80% of a suggested allocation amount to an emergency resource pool, and request that "X7" resource amount be transferred every month to reach the goal set by the entity systems 10 based in part on the user data. If the user 4 modifies the resource allocations the system 10 will display on the user interface how the goals will be met or change (e.g., reach the goals quicker, goal amounts may increase or decrease, or the like). Alternatively, if the user 4 modifies the goal (e.g., increases or decreases the goal) the suggested resource allocations may change (e.g., required resource allocations to meet the modified goal change).

FIG. 2 further illustrates in block 116 that the selected new resource pool is initiated and/or allocations of resources are automatically initiated at the initiation the new resource pool (e.g., at opening). The present invention provides for identifying the most relevant resource pool (e.g., account) and allocation of resources for the user 4 at the time of initiating the new resource pool, such that the one or more processing devices are not required to initiate multiple resource pools and make multiple allocations of resources after the user 4 initiates the new resource pool in order to achieve the desired purpose the user 4 has for the new resource pool. Since of the purpose of the new resource pool is determined as the user 4 is requesting initiation of the new resource pool, then the processing device can set up the desired resource pool type and resource allocation beginning from initiation of the resource pool. This process improves the user 4 experience and/or the reduces the amount of processing that the user computer systems 20 and/or entity systems 10 are required to do to initiate the new resource pool and provide resource allocations for the new resource pool.

Block 118 further illustrates that the user 4 is allowed to share the new resource pool and/or allocations of resources with other users. For example, the user 4 may be able to share the resource pool and resource allocations with other users that may provide further insight to achieve the purpose of the resource pool or to help provide additional resources to meet the purpose and/or goal of the new resource pool. As such, other users may provide additional suggestions for allocations to achieve the purpose of the resource pool (e.g., a child may share the information with a parent, a dependent may share information with a caregiver, or the like). Moreover, a user 4 may share the new resource pool type and/or resource allocations with a joint resource pool holder (e.g., domestic partner, business partner, employees, or the like). The sharing may occur before or after the initiation of the resource pool and/or the resource allocation. As such, in some instances before the user 4 selects a suggested resource pool and/or a suggested resource allocation, a joint resource pool holder may provide input regarding what resource pool and/or resource allocations to select. In some aspects of the invention, the suggested and selected resource allocations may be based on and received from the resource pools of the joint resource pool holders (e.g., suggested goals for an emergency fund may be based on the resources in the user's husband/wife's emergency fund, or the like). Additionally, the other uses may provide additional resources to meet the purpose of the new resource pool (e.g., vacation, car, house, pay down debt, education funds, or the like). For example, the other users may provide additional resources for the new resource pool at the time the new resource pool is initiated, or after the new resource pool has been initiated. As such, in some aspects of the invention other users may allow the user and/or entity to access the resource pools of the other users to aid in allocating resources. For example, the resource pools of other users (e.g., partners, child, parents, or the like) may be included in the determination of the purpose of the new resource pool, the allocation of resources for the new resource pool, the goals for the new resource pool, and/or the modification of resources for other current resource pools.

FIG. 2 further illustrates that the entity systems 10 may provide additional information related to the purpose of the new resource pool at the time of initiating the new resource pool. The additional information may be third-party entity information related to the purpose of the resource pool. For example, the entity systems 10 may direct the user 4 to third-party entity partners that can assist in the purpose of the resource pool, or otherwise provide information about third-party entities and/or products on the user interface as the user is initiating the resource pool. For example, if the user 4 is saving for a vacation the entity systems 10 may provide third-party travel entities and/or products to help give the user 4 additional information regarding the costs associated with a vacations and/or planning the vacation. As such, the user 4 may plan a vacation at the time of initiating the resource pool in order to determine the estimated resources needed to take the vacation. It should be understood that any type of information associated with the purpose of the resource pool may be displayed to the user 4 as the user 4 is initiating the new resource pool.

It should be understood, that all of the information regarding the resource pools (e.g., user 4 or joint resource poll holder), the allocations of resources, the goals, the other user resource pools, and/or other the third-party entity information may be presented to the user 4 in a user interface that is an integrated interface that displays aspects from the entity, from other users, as well as information from third party-systems. In this way the entity systems 10 may prevent the user from leaving the entity site to go to a third-party entity site to help the user achieve the desired purpose of the resource pool, and more particularly to deter the user 4 from utilizing a resource pool from another entity to achieve the desired purpose of the user 4. As such, the entity is benefited by keeping the user 4 within the applications presented by the entity because the user 4 is more likely use the resource pools with the entity systems 10 if the entity helps provide the information that the user 4 needs to meet the purpose of the resource pool.

FIG. 3 presents a process flow for allocating resources in a new resource pool and/or modifying the allocation of resources of the user's current resource pools. As illustrated by block 202 in FIG. 3, an indication is received from a user 4 through user computer systems 20 to initiate a new resource pool. This may be done in the same way as previously described with respect to block 102 in FIG. 2.

Block 204 illustrates that the purpose of the new resource pool is identified. In some embodiments, the purpose may be determined as was described in blocks 104 and 106 of FIG. 2. However, in other embodiments of the invention the purpose may be determined in other ways, such as but not limited to the user providing a purpose after the new resource pool is initiated, determining a purpose based on how the resources in the resource pool (e.g., new resource pool and/or current resource pool of the user 4) are allocated (e.g., if resources are distributed for medical expenses the resource pool may be a flex medical account, if resources are allocated with an automatic withdraw for a mortgage, student loans, car payment it may be a resource pool used to pay down debt, or the like), or the like.

In some aspects of the invention the purpose of the resource pool may be described by determining goals of the user 4, as was previously described with respect to FIG. 2. In some aspects of the invention, the goals for the resource pool may be received directly from the user 4. For example, the user 4 may simply provide the goal and a goal amount to the entity. In other aspects of the invention the goals may be determined based on capturing user data for the user 4. For example, the entity systems 10 may determine that the user has a number of different resource pools, but may determine that the user 4 has no investment related resource pool, and as such a goal may be to create an investment resource pool and invest resources. In other examples, the entity system 10 may determine that the user has mortgages, student loans, and/or debts, and the goal of the user 4 may be to set up the new resource pool to pay down the debt. Regardless of how the purpose of the new resource pool is determined, goals may be set by the entity systems 10 automatically and/or by the user 4 providing specific goals to achieve the purpose of the new resource pool. Continuing with the example when the purpose of the new resource pool is to pay down debt, for example a second mortgage, a specific goal may be set to pay off the entire amount of the second mortgage by a particular time or within a time period. The specific goal may be suggested by entity systems 10 by identifying the amount remaining on the user's second mortgage, or it may be provided and/or modified by the user 4 along with, or in response to, selecting the purpose of the new resource pool. The specific goals, and ultimately the suggested resource allocations described in block 208 and 210 may be determined in part by accessing user data as described with respect to block 206.

As illustrated by block 206, and as previously described, in part, in block 108 of FIG. 2, the entity systems 10 may further capture both user data, as well as other user data, related to the resource pools owned by the user 4 and other users, and how the user 4 and other users allocate resources within the resource pools. The user data may be accessed by the entity through the user resource pool systems 30 by the entity systems 10. As previously discussed, one or more user resource pool systems 30 may store user data related to the resource pools owned by the user 4 or other users, and how the resources within the pools are allocated (e.g., inflow and outflows of resources illustrating incoming income and outgoing payments). In other aspects of the invention the user data may be accessed by the entity through the third-party entity systems 40 by the entity systems 10 (e.g., user 4 has given the entity access to the user resource pools at third-party entities). As such, the entity systems 10 determine how the resources in the user's current resource pools and the resource pools of other users are allocated, to whom the resources are allocated, an amount of resources allocated, the frequency of when the resources are allocated, or the like.

Block 208 in FIG. 3 illustrates that suggested resource allocations for the new resource pools are determined based at least in part on the purpose of the resource pool (e.g., the general purpose, as well as the specific goals of the user 4 to achieve the purpose), the user data related to the user's other resource pools (e.g., allocations of the resources, inflows, outflows, available resources, or the like), and/or the other user data related to the resource pools of other users (e.g., allocations of resources, or the like). For example, when a user 4 initiates a request for the new resource pool for the purpose to pay down debt (e.g., the specific goal of the entire amount of the second mortgage), the entity systems 10 may analyze the user's resource pools, as well as other user resource pools, and the resource allocations therein in order to determine a suggested amount of resources the user 4 should or can allocate to the new resource pool. For example, the entity systems 10 may identify that other users that are similar to the user 4 allocate an average of "Y1" resources to an account to pay down a similar type of debt. However, the user 4 may have more available resources to pay down debt, and as such, may suggest that the user allocate an "Y2" (e.g., greater than Y1) amount of resources to the new resource pool to pay down a similar type of debt.

FIG. 3 further illustrates in block 210 that suggested modifications of the allocation of the resources in the other resource pools owned by the user 4 are identified in order to help the user 4 to achieve the purpose of the new resource pool being initiated. For example, returning to the example to pay down debt (e.g., a specific goal to pay down debt), the entity systems 10 may also provide modifications for the user's other resource pools. As such, the entity systems 10 may determine that the user should transfer resources being allocated for one resource pool (e.g., excess resources used to pay down a car) and direct the excess resources to the new resource pool (e.g., pay down the second mortgage with a higher interest rate). Additionally, the entity systems 10 may determine that the user 4 should end a resource allocation in a resource pool, and direct the resources to the new resource pool (e.g., cancel cable and allocate the resources to the new resource pool to pay down debt). It should be understood that the entity systems may suggest any type of modification of resource allocations based on the user's current resource allocations in the user's current resource pools.

Block 212 of FIG. 3 illustrates that the suggested resource allocations for the new resource pool, the suggested modifications for the allocation of the resources in the current resource pools of the user 4, and/or the specific goals for achieving the purpose of the new resource pool are provided to the user for verification over the user interface. For example, with respect to a new resource pool for paying down debt, the entity systems 10 may suggest an initial resource allocation, monthly allocations to the new resource pool, and/or modifications to the resource allocations of current resource pools to fund the initial resource allocation, and/or monthly allocations to achieve the specific goals (e.g., initial transfer from a checking account, the cancellation of a purchase of a product from another account, and redistribution of the resources from the canceled purchase to the new resource pool for paying down debt, or the like). In some aspects of the invention, the entity systems 10 may automatically populate the user interface for the user 4 (e.g., an integrated interface for the new resource pool and/or other resources pools of the user 4) with the amount of the initial allocation of resources (e.g., funds) to the new resource pool, the modification to the current resource pools of the user 4, and/or the specific goals for achieving the purpose that are all displayed in the user interface. In some aspects of the invention, the user 4 may change the suggested allocations provided by the entity systems 10 by changing the auto-populated fields within the user interface (e.g., changing the allocations, the resource pools from which the allocations are received, and/or the specific goals. For example, the user 4 may want to decrease in the initial allocation of resources to the new resource pool and increase the monthly resource allocations, change the resource pools from which the resource allocations are made, and increase the specific goal amount to pay down the debt faster. As one input is changed in the user interface, the rest of the inputs are automatically updated in real-time or near real-time in order to illustrate to the user how the changes in the allocations and goals affects the other inputs.

Block 214 in FIG. 3 illustrates that the entity systems 10 receive from the user computer systems 20 one or more selections of one or more resource allocations for the new resource pool (e.g., allocations from multiple resource pools, initial allocations, recurring allocations for a time period, or the like) and/or one or more selections of one or more suggested modifications for the allocation of resources in the other resource pools (e.g., changes in resource allocations of current resource pools). For example, the entity systems 10 may receive an indication from the user 4 from the user computer systems 20 to allocate the suggested initial allocation of "Y3" resources to the new resource pool (e.g., the new resource pool for paying down debt). Moreover, the entity systems 10 may further receive an indication from the user 4 to cancel resource allocations of "Y4" for other products in other resource pools owned by the user 4 and direct the allocation of the "Y4" resources to the new resource pool on a monthly basis (e.g., or other time period) in the future. As such, the user 4 may make all of the changes to the user's resource pools (e.g., the new resource pool allocations and/or the current resource pool allocations) at the time of initiating the new resource pool.

FIG. 3 further illustrates in block 216 that the one or more selected resource allocations for the new resource pool and/or the one or more selected modified resource allocations for the current resource pools of the user 4 are initiated by the entity systems 10. As such, the allocations are automatically made in order to help the user 4 reach the purpose (e.g., the stated goal, or the like) of the user's new resource pool, while reducing the number of actions the one or more processing devices have to take to set up the new resource pools and new resource allocations and modified allocations of the resources in the current resource pools of the user 4.

It should be understood that by presenting the allocation of resources for the new resource pool and the modifications of the allocations to the user's current resource pools at the time of initiating the new resource pool, the processing of the new resource pool and the resource allocations are improved. For example, the processing devices used to initiate the new resource pool and make the allocations of resources need only utilize the processing capacity at the time of the initiation of the new resource pool and the resource allocations. In typical situations, the user 4 would open a new resource pool, and once the new resource pool is initiated the transfer the resources are thereafter made, without any input or direction from the entity. As such, the processing device would make allocations well after initiating the new resource pool, and in order to process the additional allocations, the processing devices would be required to re-identify the new resource pool and the current resource pools to make the desired allocations. Moreover, if the new resource pool was not the best vehicle for achieving the purpose the user 4 desired, the new resource pool would have to be converted to a different type of resource pool. This increases the processing times and capacity needed by the entity to create the resource pools and/or make the allocations. As such, the present invention provides improved processing speeds and times by initiating the correct resource pool and allocating suggested resources at the time of opening the new resource pool. The systems and processes described herein saves time, processing capacity, and improve processing speeds.

Block 218 further illustrates that the user 4 may share the new resource pool and/or allocations of resources with other users, as was previously discussed with respect to block 118 in FIG. 1. Furthermore, as illustrated by block 220, third-party entity information may be provided to the user 4 it aid in the allocation of resources as previously described with respect to block 120 in FIG. 1.

It should be further understood that in some embodiments of the invention, the systems and process described herein (e.g., with respect to FIGS. 1-3) may be applied to the situation when a user 4 is switching one or more resource pools from a current entity (e.g., first entity) to a new entity (e.g., second entity). For example, the user 4 may want to transfer all of the user's resource pools from one or more current entities to one or more new entities. The user 4 may allow a new entity to access all of the user's resource pools with the one or more current entities, for example, by providing the new entity the login and password information associated with accessing the resource pools of the user 4 at the one or more current entities. As such, the new entity may access the resource pools of the user in order to determine the type of resource pools, the in-flows and out-flows, the type of resource pools, or the like owned by the user 4. As previously described herein, the new entity may determine a purpose and/or goals of the resource pools, and/or receive the purpose and/or goals of the resource pools from the user 4 (e.g. for the new resource pools at the new entity and/or the current resource pools at the current entity). As such, the new entity may determine one or more new suggested resource pools and/or resource allocations for the one or more new suggested resource pools for the user to convert the user's current resource pools at one or more current entities (e.g., third-parties) to resource pools at the new entity. The suggestions may include allocating resources to accounts differently than the user 4 had previously had allocated the resources at the current entity (e.g., move excess resources from an emergency resource pool to an investment resource pool, or the like). It should be further understood that the user 4 may request the suggestions from the new entity without actually creating the new resource pools and transferring the resources from the current resource pools in order to get an idea regarding how the user 4 should allocate the resources without actually making any changes.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems, devices, or devices thereof described herein. For example, a portion of entity application 17 and/or the resource pool application 37 may be stored on the user computer systems 20, and/or a portion of the resource pool application 37 may be stored on the entity systems 10 or the user computer systems 20, in order to achieve the embodiments of the invention described herein.

It should be understood, that the systems and devices described in FIG. 1, or other devices not specifically described herein, may be configured to establish an electronic communications link with each other in order to accomplish the steps of the processes described herein. The link may be an internal link within the same entity (e.g., within the same financial institution for the nodes or devices within the nodes) or an external link with the other systems of other entities (e.g., nodes or other systems controlled by other entities). The information within systems may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format.

Moreover, it should be understood that the process flows described herein include transforming the information sent and/or received from the applications of the different systems (e.g., internally or externally) from one or more data formats into a data format associated with each of the systems. There are many ways in which information is converted within the system environment 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In accordance with embodiments of the invention, entity may be a financial institution, and the terms "financial institution" and "financial entity" include any organization that processes financial transactions including, but not limited to, banks, credit unions, savings and loan associations, investment companies, stock brokerages, assess management firms, insurance companies and the like. In specific embodiments of the invention, use of the term "bank" is limited to a financial entity in which account-bearing customers conduct financial transactions, such as account deposits, withdrawals, allocations and the like.

In accordance with embodiments of the invention, resource pools may be any type of account, and an "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user profile that includes information associated with the user, or the like. The account is associated with and/or maintained by the entity. The term "resource" may include funds, and the term "funds" includes forms of currency or payment stored by a financial institution in an account.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
| --- | --- | --- | --- |
| 7259US1.014033.2850 | To be assigned | RESOURCE TRACKING AND UTILIZATION SYSTEM | Concurrently herewith |
| 7262US1.014033.2852 | To be assigned | RESOURCE ASSIGNMENT SYSTEM WITH ALLOCATION ASSIST | Concurrently herewith |
| 7263US1.014033.2853 | To be assigned | SYSTEM FOR RESOURCE ALLOCATION AT TIME OF USE AND CONSERVATION OF UNUSED PORTION | Concurrently herewith |
| 7264US1.014033.2854 | To be assigned | SYSTEM FOR RESOURCE ALLOCATION AND CONSERVATION OF UNUSED PORTION | Concurrently herewith |
| 7265US1.014033.2855 | To be assigned | SYSTEM FOR MONITORING RESOURCE ACTIVITY AND ALERT GENERATION | Concurrently herewith |

What is claimed is:

1. A system for providing suggested resource pools at initiation of a resource pool, the system comprising:
   one or more memory devices storing computer-readable code; and
   one or more processing devices operatively coupled to the one or more memory devices, wherein the one or more processing devices are configured to execute the computer-readable code to:
      electronically receive an indication from a user requesting to initiate a new resource pool, wherein the indication is received from a user computer system, wherein the new resource pool comprises a new account with a financial institution;
      electronically request an inquiry regarding a purpose for the new resource pool, wherein the request is sent to the user computer system by an entity system;
      electronically receive a response from the user regarding the purpose of the new resource pool, wherein the response is received from the user computer system, and wherein the purpose is the purpose of the new account or resources within the new account;
      electronically access user data for the user or other users regarding other user resource pools of the user or the other users, wherein the user data is accessed by accessing resource pool systems, and wherein the other user resource pools are other user accounts and the user data relates to the use of the resources by the user in the other user accounts;
      electronically identify a suggested resource pool based on the response from the user regarding the purpose of the new resource pool and the user data, wherein the suggest resource pool may comprise a resource pool type or an allocation of the resources within the new account;

electronically determine when the new resource pool requested by the user and the suggested resource pool are the same and automatically initiating the new resource pool of the user, wherein the automatic initiation of the new resource pool improves processing of the system by automatically initiating the new account of the user without alerting the user of the suggested resource pool;

electronically determine when the new resource pool requested by the user and the suggested resource pool are different, and in response:

electronically provide the user the suggested resource pool on a user interface, wherein the user interface is provided by the entity system on the user computer system; and electronically receive a selected resource pool, wherein the selected resource pool is received from the user computer system; and electronically initiate the selected resource pool as the new resource pool, wherein the selected resource pool is initiated through the entity systems.

2. The system of claim 1, wherein the inquiry regarding the purpose for the new resource pool comprises an inquiry regarding the resource pool type and a resource allocation amount for the new resource pool; and wherein the response from the user regarding the purpose of the new resource pool comprises the resource pool type and the resource allocation amount.

3. The system of claim 1, wherein the inquiry regarding the purpose for the new resource pool is an educated inquiry that includes potential purposes presented for user selection based on the user data related to the other resource pools of the user or the allocation of the resources within the other resource pools of the user.

4. The system of claim 1, wherein the one or more processing devices are configured to execute the computer-readable code to:

electronically provide the user third party entity information related to the purpose of the new resource pool.

5. The system of claim 1, wherein the one or more processing devices are configured to execute the computer-readable code to:

electronically receive a request from the user to provide new resource pool information to one or more of the other users to aid in achieving the purpose of the new resource pool.

6. The system of claim 1, wherein the one or more processing devices are further configured to execute the computer-readable code to:

electronically access the user data for the user regarding resource allocations within the other resource pools of the user;

electronically identify one or more suggested resource allocations for the new resource pool based on the response from the user regarding the purpose of the new resource pool and the user data regarding the resource allocations within the other resource pools of the user;

electronically provide the user the one or more suggested resource allocations for the new resource pool on the user interface, wherein the user interface is provided by the entity systems on the user computer system;

electronically receive a selected resource allocation for the new resource pool from the one or more suggested resource allocations, wherein the selected resource allocation for the resource pool is received from the user computer system; and electronically initiate the selected resource allocation for the new resource pool, wherein the selected resource allocation for the new resource pool is initiated through the entity systems.

7. The system of claim 1, wherein the one or more processing devices are further configured to execute the computer-readable code to:

electronically access the user data for the other users regarding resource allocations within the other resource pools of the other users;

electronically identify one or more suggested resource allocations for the new resource pool based on the response from the user regarding the purpose of the new resource pool and the user data regarding the resource allocations within the other resource pools of the other users;

electronically provide the user the one or more suggested resource allocations for the new resource pool on the user interface, wherein the user interface is provided by the entity systems on the user computer system;

electronically receive a selected resource allocation for the new resource pool from the one or more suggested resource allocations, wherein the selected resource allocation for the resource pool is received from the user computer system; and electronically initiate the selected resource allocation for the new resource pool, wherein the selected resource allocation for the new resource pool is initiated through the entity systems.

8. The system of claim 1, wherein the one or more processing devices are further configured to execute the computer-readable code to:

electronically receive an indication from the user for a resource allocation for the resource pool, wherein the indication is received from the user computer system;

electronically access the user data for the other users regarding resource allocations for the resource pools of the other users, by accessing user resource pool systems;

electronically determine one or more suggested resource allocations for the new resource pool;

electronically determine when the resource allocation for the new resource pool received from the user and the one or more suggested resource allocations are the same and automatically initiating the resource allocation;

electronically determine when the resource allocation received from the user and the one or more suggested resource allocations are different, and in response:

electronically provide the user the one or more suggested resource allocations, wherein the user interface is provided by the entity system on the user computer system; and electronically receive a selected resource allocation for the resource allocation, wherein the selected resource allocation is received from the user system;

electronically initiate the resource allocation, wherein the resource allocation is initiated through the entity systems, and wherein processing of the initiation of the selected resource allocation and initiation of the new resource pool at the same time improves the processing by reducing the number of processing steps.

9. A method for providing suggested resource pools at initiation of a resource pool, the method comprising:
electronically receive, by one or more processing devices, an indication from a user to initiate a new resource pool, wherein the indication is received from a user computer system, wherein the new resource pool comprises a new account with a financial institution;
electronically request, by the one or more processing devices, an inquiry regarding a purpose for the new resource pool, wherein the request is sent to the user computer system by an entity system;
electronically receive, by the one or more processing devices, a response from the user regarding the purpose of the new resource pool, wherein the response is received from the user computer system, and wherein the purpose is the purpose of the new account or resources within the new account;
electronically access, by the one or more processing devices, user data for the user or other users regarding other user resource pools of the user or the other users, wherein the user data is accessed by accessing resource pool systems, and wherein the other user resource pools are other user accounts and the user data relates to the use of the resources by the user in the other user accounts;
electronically identify, by the one or more processing devices, a suggested resource pool based on the response from the user regarding the purpose of the new resource pool and the user data, wherein the suggest resource pool may comprise a resource pool type or an allocation of the resources within the new account;
electronically determine, by the one or more processing devices, when the new resource pool requested by the user and the suggested resource pool are the same and automatically initiating the new resource pool of the user, wherein the automatic initiation of the new resource pool improves processing of the system by automatically initiating the new account of the user without alerting the user of the suggested resource pool;
electronically determine, by the one or more processing devices, when the new resource pool requested by the user and the suggested resource pool are different, and in response:
electronically provide the user the suggested resource pool on a user interface, wherein the user interface is provided by the entity system on the user computer system; and
electronically receive a selected resource pool, wherein the selected resource pool is received from the user computer system; and
electronically initiate, by the one or more processing devices, the selected resource pool as the new resource pool, wherein the selected resource pool is initiated through the entity systems.

10. The method of claim 9, wherein the inquiry regarding the purpose for the new resource pool comprises an inquiry regarding the resource pool type and a resource allocation amount for the new resource pool; and wherein the response from the user regarding the purpose of the new resource pool comprises the resource pool type and the resource allocation amount.

11. The method of claim 9, wherein the inquiry regarding the purpose for the new resource pool is an educated inquiry that includes potential purposes presented for user selection based on the user data related to the other resource pools of the user or the allocation of the resources within the other resource pools of the user.

12. The method of claim 9, further comprising:
electronically provide, by the one or more processing devices, the user a third party entity information related to the purpose of the new resource pool.

13. The method of claim 9, further comprising:
electronically receive, by the one or more processing devices, a request from the user to provide new resource pool information to one or more of the other users to aid in achieving the purpose of the new resource pool.

14. The method of claim 9, further comprising:
electronically access, by the one or more processing devices, the user data for the user regarding resource allocations within the other resource pools of the user;
electronically identify, by the one or more processing devices, one or more suggested resource allocations for the new resource pool based on the response from the user regarding the purpose of the new resource pool and the user data regarding the resource allocations within the other resource pools of the user;
electronically provide, by the one or more processing devices, the user the one or more suggested resource allocations for the new resource pool on the user interface, wherein the user interface is provided by the entity systems to the user system;
electronically receive, by the one or more processing devices, a selected resource allocation for the new resource pool from the one or more suggested resource allocations, wherein the selected resource allocation for the resource pool is received from the user computer system; and
electronically initiate, by the one or more processing devices, the selected resource allocation for the new resource pool, wherein the selected resource allocation for the new resource pool is initiated through the entity systems.

15. The method of claim 9, further comprising:
electronically access, by the one or more processing devices, the user data for the other users regarding resource allocations within the other resource pools of the other users;
electronically identify, by the one or more processing devices, one or more suggested resource allocations for the new resource pool based on the response from the user regarding the purpose of the new resource pool and the user data regarding the resource allocations within the other resource pools of the other users;
electronically provide, by the one or more processing devices, the user the one or more suggested resource allocations for the new resource pool on the user interface, wherein the user interface is provided by the entity systems on the user computer system;
electronically receive, by the one or more processing devices, a selected resource allocation for the new resource pool from the one or more suggested resource allocations, wherein the selected resource allocation for the resource pool is received from the user computer system; and
electronically initiate, by the one or more processing devices, the selected resource allocation for the new resource pool, wherein the selected resource allocation for the new resource pool is initiated through the entity systems.

16. The method of claim 9, further comprising:
- electronically receive, by the one or more processing devices, an indication from the user for a resource allocation for the resource pool, wherein the indication is received from the user computer system;
- electronically access, by the one or more processing devices, the user data for the other users regarding resource allocations for the resource pools of the other users, by accessing user resource pool systems;
- electronically determine, by the one or more processing devices, one or more suggested resource allocations for the new resource pool;
- electronically determine, by the one or more processing devices, when the resource allocation for the new resource pool received from the user and the one or more suggested resource allocations are the same and automatically initiating the resource allocation;
- electronically determine, by the one or more processing devices, when the resource allocation received from the user and the one or more suggested resource allocations are different, and in response:
  - electronically provide the user the one or more suggested resource allocations on the user interface, wherein the user interface is provided by the entity system to the user computer system; and
  - electronically receive a selected resource allocation for the resource allocation, wherein the selected resource allocation is received from the user system;
- electronically initiate the resource allocation, wherein the resource allocation is initiated through the entity systems; and
- wherein processing of the initiation of the selected resource allocation and initiation of the new resource pool at the same time improves the processing by reducing the number of processing steps.

17. A computer program product for providing suggested resource pools at initiation of a resource pool, the computer program product comprising at least one non-transitory computer-readable medium having computer-readable program code portions embodied therein, the computer-readable program code portions comprising:
- an executable portion configured to electronically receive an indication from a user requesting to initiate a new resource pool, wherein the indication is received from a user computer system, wherein the new resource pool comprises a new account with a financial institution;
- an executable portion configured to electronically request an inquiry regarding a purpose for the new resource pool, wherein the request is sent to the user computer system by an entity system;
- an executable portion configured to electronically receive a response from the user regarding the purpose of the new resource pool, wherein the response is received from the user computer system, and wherein the purpose is the purpose of the new account or resources within the new account;
- an executable portion configured to electronically access user data for the user or other users regarding other user resource pools of the user or the other users, wherein the user data is accessed by accessing resource pool systems, and wherein the other user resource pools are other user accounts and the user data relates to the use of the resources by the user in the other user accounts;
- an executable portion configured to electronically identify a suggested resource pool based on the response from the user regarding the purpose of the new resource pool and the user data, wherein the suggest resource pool may comprise a resource pool type or an allocation of the resources within the new account;
- an executable portion configured to electronically determine when the new resource pool requested by the user and the suggested resource pool are the same and automatically initiating the new resource pool of the user, wherein the automatic initiation of the new resource pool improves processing of the system by automatically initiating the new account of the user without alerting the user of the suggested resource pool;
- an executable portion configured to electronically determine when the new resource pool requested by the user and the suggested resource pool are different, and in response:
  - electronically alert the user of the suggested resource pool, wherein the alert is provided by the entity system to the user computer system; and
  - electronically receive a selected resource pool, wherein the selected resource pool is received from the user computer system; and
- an executable portion configured to electronically initiate the selected resource pool as the new resource pool, wherein the selected resource pool is initiated through the entity systems.

* * * * *